United States Patent
Smith et al.

[11] Patent Number: 5,864,135
[45] Date of Patent: Jan. 26, 1999

[54] THERMAL IMAGER REFERENCING SYSTEM

[75] Inventors: Brian Frederick Smith, Rayleigh; Duncan James Webb, Hockley, both of United Kingdom

[73] Assignee: GEC-Marconi Limited, Middlesex, United Kingdom

[21] Appl. No.: 764,636

[22] Filed: Dec. 11, 1996

[30] Foreign Application Priority Data

Jan. 6, 1996 [GB] United Kingdom ................ 9600256

[51] Int. Cl.⁶ .................. G01J 5/52; G01J 5/54
[52] U.S. Cl. .............. 250/252.1; 250/332; 250/347
[58] Field of Search .................. 250/252.1 A, 332, 250/349, 350, 351, 353, 347, 334

[56] References Cited

U.S. PATENT DOCUMENTS

| | | |
|---|---|---|
| 4,073,576 | 2/1978 | Bastian . |
| 4,948,964 | 8/1990 | Gohlke . |
| 5,245,190 | 9/1993 | Sibbald et al. ................ 250/351 |
| 5,604,346 | 2/1997 | Hamrelius et al. .............. 250/252.1 |

FOREIGN PATENT DOCUMENTS

| | | |
|---|---|---|
| 0476243 | 3/1992 | European Pat. Off. . |
| 2 225 914 | 6/1990 | United Kingdom . |

*Primary Examiner*—Edward J. Glick
*Attorney, Agent, or Firm*—Venable; Robert J. Frank; Michael A. Sartori

[57] ABSTRACT

A thermal imager referencing system comprises two rotating cranks in the form of discs (7, 8) each pivotally attached to connecting member (9). The discs (7, 8) are rotated at a constant speed causing two mirrors laterally displaced along connecting member (9) to intercept an optical path X of a thermal imager associated with the referencing system. Each rotation through 360 degrees of the discs (7, 8) causes each mirror to pass once through the optical path, the mirror surfaces being respectively arranged to cause a linear array of detector elements (not shown) of the thermal imager to view alternately thermo-electric devices (14, 16), which are at different temperatures, during the flyback time associated with the thermal imager. The referencing system enables processing means of the thermal imager to normalize the detector array, compensating for DC offset and differences in gain between different elements of the detector array. The referencing system is of a particularly compact design and minimizes the effect of any temperature variations across the surfaces of the Peltier on the normalization process.

12 Claims, 2 Drawing Sheets

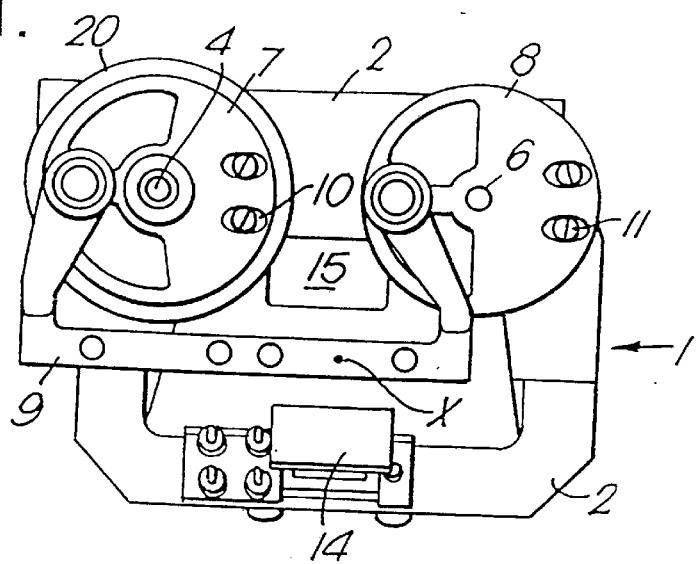
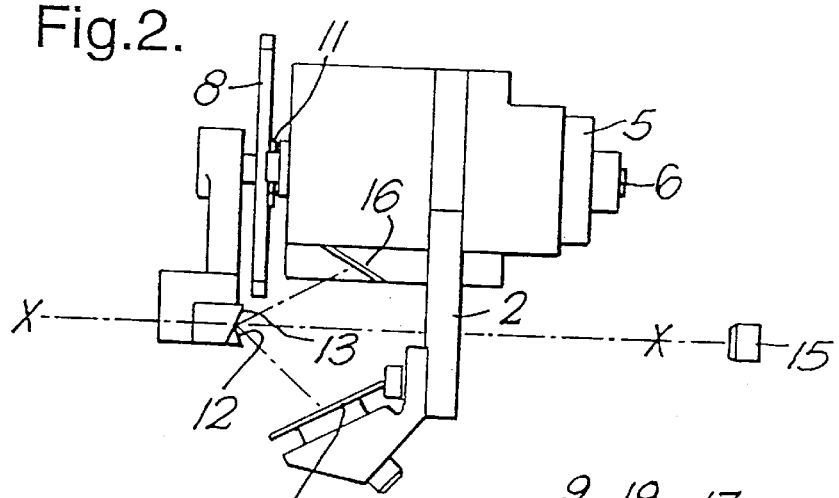
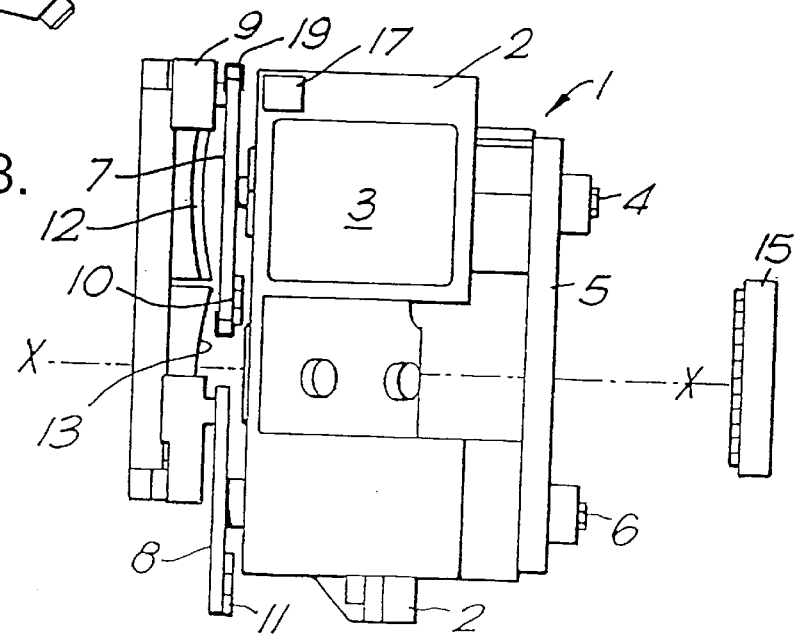

THERMAL IMAGER REFERENCING SYSTEM

BACKGROUND OF THE INVENTION

The present invention relates to a referencing system for an array of detector elements of a thermal imager and in particular to a referencing system for use with a thermal imager having a linear array of detector elements over which a viewed scene is scanned.

In most thermal imager systems it is necessary to process the signal received from the output of an array of detector elements of the imager, in order to compensate for DC offset in the output between different elements of the array, and to compensate for differences in responsivity (gain) between the elements. This is referred to as "normalizing" the detector array.

DC offset between elements of a detector array can be compensated for by exposing all the elements to a thermal reference source of uniform temperature. Certain types of detector arrays such as pyro-electric arrays require exposure to a uniform field in order to function, for they rely on the change of a charge which occurs between being exposed to a closed, or shuttered, field and being exposed to the scene to be viewed. The exposure to the shuttered field compensates every frame for any DC offset. With such pyro-electric type detectors, the difference in gain between the elements can be compensated for periodically by exposing the detector elements to a uniformly intense open field, and this may be done once only in the life of the detector during the manufacturing process.

With photovoltaic type detectors there is no requirement to shutter the detector array and therefore there is no inherent DC offset compensation, but normally both DC offset and non-uniformity gain characteristics have to be compensated for. This can be achieved by exposing the detector array to uniform light and dark fields during an initial calibration process, however the DC offset between elements is dependent on the mean temperature of the viewed scene. The gain characteristics of the elements are also unlikely to be linear and therefore any compensation for the difference in gain characteristics will vary in dependence on the mean temperature of the viewed scene. In certain applications it is preferable that differences in offset and gain characteristics of the detector elements of photovoltaic detectors are compensated for in use.

Many photovoltaic imaging systems employ a linear array of detector elements over which the image is scanned. With such a system there will normally be a "flyback" period when the scanning mechanism returns to its starting position. Even with a scanning mechanism employing a multifaceted polygonal mirror surface where the scanner itself does not have a flyback period, because the final image generated is normally to be a TV-type display which itself has a flyback period, there is a period in which information is not read out from the detector, or the information read out is not utilized in the final display. The "flyback" period can conveniently be utilised to normalize the elements of the array by exposing them to two uniform thermal reference sources at different temperatures.

U.S. Pat. No. 4 948 964 discloses a method for normalizing a photovoltaic detector array. This is achieved by exposing the detector array to a uniform thermal reference source. The detector array is exposed to the reference source by a scanning minor surface which is inserted in the optical path of the detector array during the flyback period. The mirror surface is arranged such that during the flyback period the detector array views a thermo-electric cooler at a uniform temperature. The mirror surface itself forms a radial sector of a disc rotated about an axis, and comprises two portions of different reflectivities. The two portions of different reflectivities enable two reference temperatures to be observed, the highly reflective portion exposing the detector array to a temperature approximately equal to that of the thermo-electric cooler, while the partially reflective portion exposes the detector array to a temperature between the temperature of the thermo-electric cooler and the temperature of the mirror surface itself.

The problems with the above described method are that the scanning mirror surface has to be sufficiently large in order to ensure that the whole detector array is irradicated by the thermo-electric cooler and that it is difficult to control the range of the two reference sources, for the range of the partially reflective mirror surface will depend upon the temperature of the mirror surface itself, which in turn will depend upon the temperature of the working environment. It is an aim of the present invention to provide an improved referencing system for a thermal imager.

SUMMARY OF THE INVENTION

According to a first aspect of the present invention there is provided a referencing system for an array of detector elements of a thermal imager, the system comprising: at least one mirror surface; at least one thermal reference source; and a mechanical arrangement for cyclically displacing the mirror surface into an optical path of the thermal imager, such that the array of detector elements views the reference source via the mirror surface, the mechanical arrangement comprising two cranks arranged to rotate about respective axes in the same direction and joined by a connecting member on which connecting member the mirror surface is mounted.

By employing the present invention it is possible to provide a referencing system of very compact dimensions, for if the cranks are rotated at a constant speed the lateral velocity of the connecting member between the cranks is a sinusoid and the referencing system can be arranged such that the connecting member and mirror surface attached to it cross the optical path to the detector array at its point of maximum velocity. This enables referencing to be performed in the flyback time with a smaller mechanical arrangement than would be required if the mirrored surface were arranged to be a radial sector of a rotating disc, which sector passed through the optical path. Furthermore the mirror surface does not experience any rotation and therefore the dimensions of the mirror can be minimized, enabling the overall dimensions of the referencing system to be reduced.

Preferably the cranks are in the form of two coplanar discs each rotating about a central axis perpendicular to the plane of the discs, each disc being linked to the connecting member at a point on a radius of the disc and being counterbalanced such as to compensate for the mass of the connecting member and mirror surface. Employing such a mechanism enables an angular displacement to be converted to a lateral displacement with minimal vibration being introduced into the system.

Advantageously the mirror surface is inserted into the optical path when the point at which one crank joins the connecting member is closest to the axis about which the other crank rotates. At this point the mirror surface is traveling at its maximum lateral velocity.

Preferably the system comprises two mirror surfaces mounted on the connecting member and two thermal reference sources at respective different temperatures, the mirror surfaces and the reference sources being arranged such that the mechanical arrangement in turn displaces the mirror surfaces into the optical path such that the detector array views alternate reference sources via respective mirror surfaces, and preferably the two mirror surfaces are arranged side by side on the connecting member with one mirror surface intersecting the optical path with the cranks in a first angular position and the second mirror surface intersecting the optical path when the cranks are in a second angular position rotated through 180 degrees from the first position. This enables each mirror surface to be inserted in turn in the optical path such that the detector array is exposed to two different temperature reference sources that can be set at any desired temperature, with only one temperate reference source being scanned between successive frames. It is not necessary for the detector array to view both thermal reference sources between adjacent frames for referencing normally requires a considerable number of views of each reference source over several frames, the referencing being achieved by an update process.

Preferably the mirror surface or mirror surfaces are curved such as to cause the principal rays from the detector an-ay to converge on the associated them reference source. This enables the thermal reference source to be very compact, and also avoids problems arising due to non-uniformity in the temperature of the surface of the thermal reference source as each detector element is irradicated by a large proportion of the reference source.

It may be advantageous if the connecting member is cranked so that the mirror surface or surfaces mounted on the connecting member are offset relative to the cranks.

The thermal reference source is preferably a thermo-electric (Peliter effect) device, the temperature of which can be accurately controlled by the flow of electric current through it.

According to a second aspect of the invention there is provided a thermal imager comprising the above described referencing system It is particularly advantageous if in such an imager the cranks are rotated at a constant speed and the system is arranged such that the obscuring caused by the mirror in the optical path of the imager is less than or equal to the flyback time.

Preferably the detector array comprises a linear array of detector elements wherein the mirror surface intersects and crosses the optical path in a direction nominally perpendicular to the optical orientation of the array in the optical path at the point of intersection. The near perpendicular movement of the mirror surface relative to the optical orientation of the detector array ensures that all the elements of the detector array view the same area of the reference source.

BRIEF DESCRIPTION OF THE DRAWINGS

One embodiment of the present invention will now be described by way of example only with reference to the accompanying figures, throughout which like numerals indicate like parts, and of which:

FIG. 1 is a front elevation of a thermal imager referencing system in accordance with the present invention;

FIG. 2 is a side elevation of the referencing system of FIG. 1, including the array of detector elements of a thermal imager to which the reference system is fitted;

FIG. 3 is a plan view of the referencing system of FIGS. 1 and 2; and

DETAILED DESCRIPTION OF A PREFERRED EMBODIMENT

Figure 4:
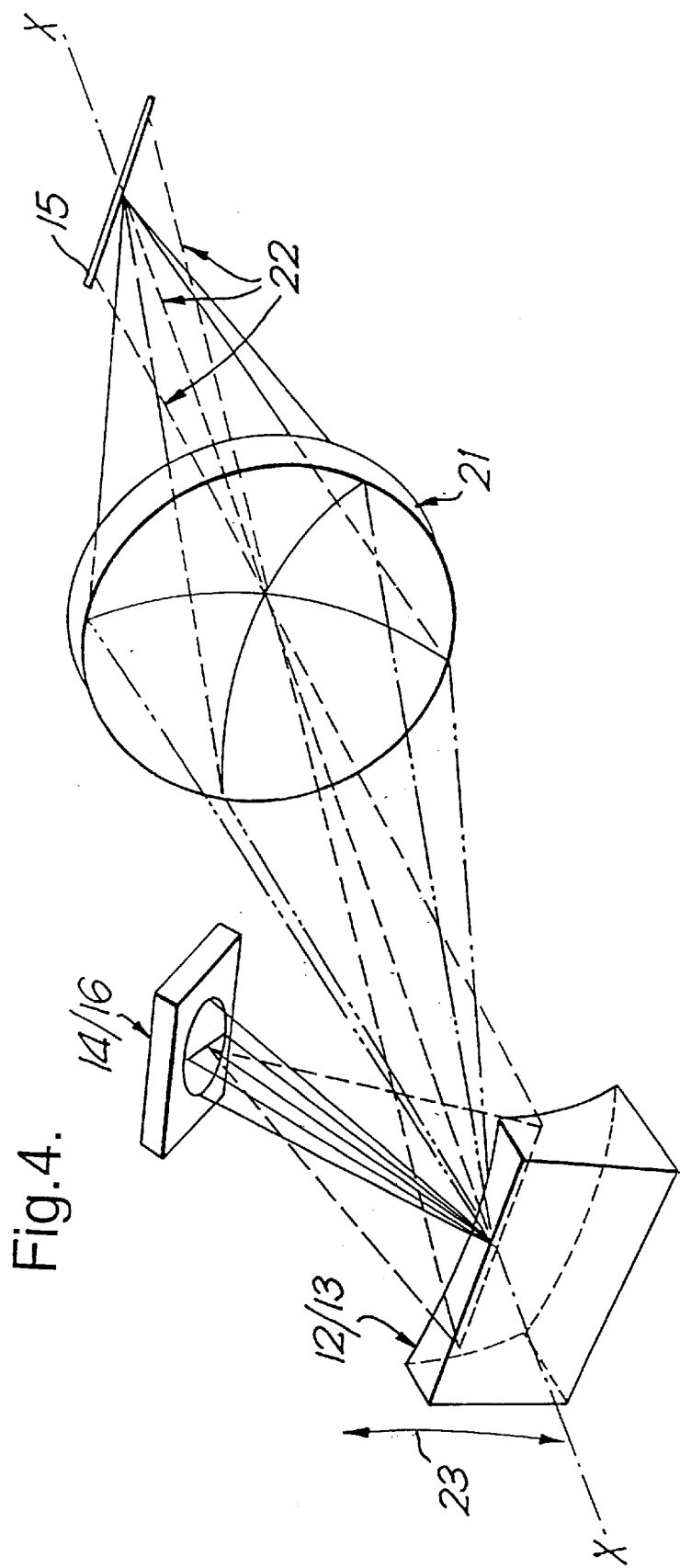
FIG. 4 schematically represents the optical configuration of a thermal imager system employing the thermal imager reference system of FIGS. 1 to 3.

Referring to FIGS. 1 through to 3, a thermal imager referencing system indicated generally as 1 comprises a body or frame 2 housing a constant speed brushless DC electric motor 3. The spindle 4 of electric motor 3 is connected to a sprocket (not shown) which drives belt 5. Belt 5 in turn drives spindle 6, spindle 6 also being retained in the frame 2.

The spindle 4 is attached to a disc 7 and similarly spindle 6 is attached to disc 8 Discs 7 and 8 are pivotally connected to connecting member by such that the discs 7 and 8 act as cranks. Counterbalanced weights 10 and 11 are attached to the discs to compensate for the weight of the connecting member 9.

The connecting member 9 is itself cranked such that mirror surfaces 12 and 13 are offset relative to discs 7 and 8.

The motor 3 rotates disc 7 at a constant angular velocity, and belt 5 ensures that disc 8 rotates in the same direction. The rotation of disc 7 causes the mean position of connecting member 9 to prescribe a circle while maintaining a horizontal position.

In the position indicated in FIGS. 1 to 3, connecting member 9 causes mirror surface 13 to intersect the optical path X of a linear array of detector elements 15 of a thermal imager, the other components of which have been omitted for clarity. These missing optical elements would typically form an aerial image of the array in the vicinity of the mirror crossing point. The optics of the thermal imager in combination with mirrored surface 13, which itself has an optical power, cause thermo-electric Peltier 14 to occur at the pupil of the imager system such that the array of detector elements 15 view the Peltier 14. The mirror surface 13 when it intersects the optical path X is moving at its maximum vertical velocity with negligible horizontal displacement relative to the orientation of the referencing system as shown in the figures.

As will be appreciated from the figures, when discs 7 and 8 are rotated through 180 degrees mirror surface 12 intercepts the optical path of the their imager, causing thermo-electric Peltier 16 to occur at the pupil of the imager system such that the detector array 15 views the Peltier 16. Again the mirror surface 12 will pass across the optical axis X at its maximum vertical velocity but passes through the optical axis X in the opposite direction to mirror surface 13.

In operation the detector array will be constantly read out while scanning optics (not shown) of the imager cause a viewed scene to be scanned across the array of detector elements 15. The position of the motor 3 is synchronized to the position of the scanning optics of the thermal imager system by means of optical sensor 17 which detects a timing mark 19 on the surface of timing ring 20. The motor is synchronized such that when a complete frame has been scanned across the array of detector elements 15, one of the two mirror surfaces then passes through the optical path X during the flyback tie prior to the next frame being scanned across the detector array. While the subsequent frame is scanned across detector array 15, discs 7 and 9 rotate through, typically, 165 degrees. Then when the complete fame has been scanned across the array, discs 7 and 8 rotate through a further typically 15 degrees such that mirror surface 13 causes the detector array to view Peltier 14 during the flyback time at the end of the frame.

Peltiers 14 and 16 are at two different respective temperatures, which temperatures are accurately known and are related to the mean scene temperature. The temperature of the first Peltier typically is chosen so that the irradiance received by detector corresponds to the mean irradiance created by the scene. Processing circuitry (not shown) of the thermal imager uses the uniform temperature viewed by the array of detector elements 15 in order to compensate for DC offset between the elements in a known manner. Subsequently when the second Peltier is viewed the processing circuitry is able to compensate for differences in gain of different elements and thereby normalize the output of the array of detector elements. Again this can be achieved by any known technique.

Referring now to FIG. 4, there is schematically illustrated the optical system employed by a thermal imager employing the reference system described above. The thermal imager system employs a number of optical elements which are represented by lens 21. This "lens" 21 causes he principal rays, indicated by broken lines 22, from the detector array 15 to converge at a focal point lying close to the plane at which the mirror surfaces 12 and 13 intersect the optical path X of the imager. Although only one mirror surface and Peltier have been illustrated, the optical configuration is typically symmetrical for the other mirror surface and Peltier.

The mirror surface 12/13 is spherical and causes all the principal rays 22 to converge on a very small area of the Peltier 14/16. The combination of the spherical surface 12/13 and the mechanical arrangement of the referencing system, as illustrated in FIGS. 1 to 3, causing the mirrored surface 12/13 only to move essentially in a "vertical" direction, ensuring that each element of the detector array 15 views the same area of the Peltier. Although vertical movement of the mirror surface 12/13 will cause a slight vertical displacement in the region viewed by the detector array, the variation in detector irradiance is within acceptable limits.

The above description refers to vertical and horizontal directions. However it will be appreciated that these terms are purely relative, for the system described may have any orientation. Furthermore the optical orientation of the array of sensor elements 15 is preferably perpendicular to the direction of movement of the mirror surface 12/13 as indicated by the arrow 23 in FIG. 4. However the optical orientation of the array of detector elements where the mirror surface intercepts the optical path X need not have the same orientation as the true detector array.

The above describes one embodiment only of the present invention, but many variations within the scope of tee appended claims will be apparent to one skilled in the art.

What we claim is:

1. A referencing system for an array of detector elements of a thermal imager, said thermal imager having an optical path, the system comprising:
    two mirror surfaces;
    two thermal reference sources at respective different temperatures; and
    a mechanical arrangement for cyclically displacing the mirror surfaces into the optical path of the thermal imager such that the array of detector elements views in turn each thermal reference source via a respective mirror surface, said mechanical arrangement comprising:
        two cranks arranged to rotate about respective axes in the same direction; and
        a connecting member on which the two mirror surfaces are mounted, said connecting member joining said two cranks.

2. A system as claimed in claim 1 wherein the cranks are in the form of two coplanar discs each rotating about a central axis perpendicular to the plane of the discs, each disc being linked to the connecting member at a point on a radius of the disc and being counterbalanced such as to compensate for the mass of the connecting member and the two mirror surfaces.

3. A system as claimed in claim 1 wherein one of the mirror surfaces is inserted into the optical path when the point at which one crank joins the connecting members is closest to the axis about which the other crank rotates.

4. A system as claimed in claim 1 wherein the two mirror surfaces are arranged side by side on the connecting member with one mirror surface intersecting the optical path with the cranks in a first angular position and the second mirror surface intersecting the optical path when the cranks are in a second angular position rotated through 180 degrees from the first annular position.

5. A system as claimed in claim 1 wherein at least one of the mirror surfaces is curved such as to cause principal rays from the array to converge on the associated thermal reference source.

6. A system as claimed in claim 1 wherein the connecting member is cranked such that the mirror surfaces are mounted offset relative to a reference line passing through points at which the connecting member is joined to the cranks.

7. A system as claimed in claims 1 wherein at least one of the thermal reference sources is a thermo-electric device.

8. A system as claimed in claim 1 wherein the cranks are rotated at a constant speed such that one of the mirror surfaces is in the optical path for a period less than or equal to a flyback time occuring after a frame is scanned across the array of detector elements.

9. A system as claimed in claim 1 wherein the array of the detector elements is arranged as a linear array of detector elements having an optical orientation, wherein one of the mirror surfaces intersects and crosses the optical path in a direction nearly perpendicular to the optical orientation of the linear array of detector elements.

10. A system as claimed in claim 1 further comprising an optical arrangement which forms an aerial image of the array substantially at a point where one of the mirror surfaces intersects the optical path.

11. A referencing system for an array of detector elements of a thermal imager, said thermal imager having an optical path, the system comprising:
    a thermal reference source;
    a mirror surface, said mirror surface being curved such as to cause principal rays from the array to converge on the thermal reference source; and
    a mechanical arrangement for cyclically displacing the mirror surface into the optical path of the thermal imager such that the array of detector elements views the reference source via the mirror surface, said mechanical arrangement comprising:
        two cranks arranged to rotate about respective axes in the same direction; and
        a connecting member on which the mirror surface is mounted, said connecting member joining said two cranks.

12. A referencing system for an array of detector elements of a thermal imager, said thermal imager having an optical path, the system comprising:

a mirror surface;

a thermal reference source;

an optical arrangement, said optical arrangement forming an aerial image of the array substantially at a point where the mirror surface intersects the optical path; and a mechanical arrangement for cyclically displacing the mirror surface into the optical path of the thermal imager such that the array of detector elements views the reference source via the mirror surface, said mechanical arrangement comprising:

two cranks arranged to rotate about respective axes in the same direction; and a connecting member on which the mirror surface is mounted, said connecting member joining said two cranks.

* * * * *